Nov. 11, 1958 W. R. SWANSON 2,859,812
FUEL CELL BEAD RETAINERS
Filed May 28, 1954 2 Sheets-Sheet 1
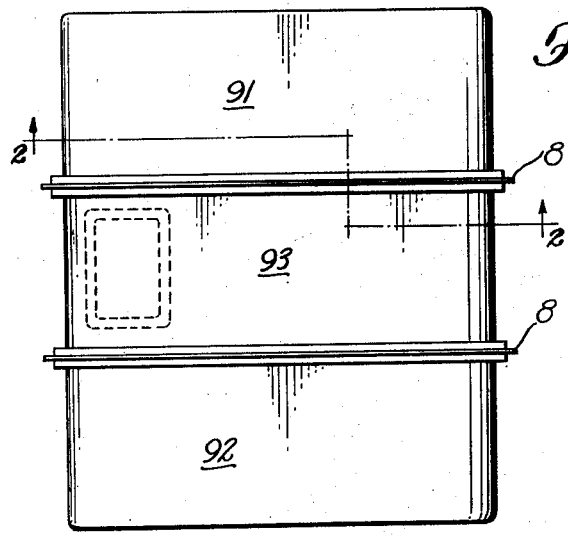
Fig. 1.
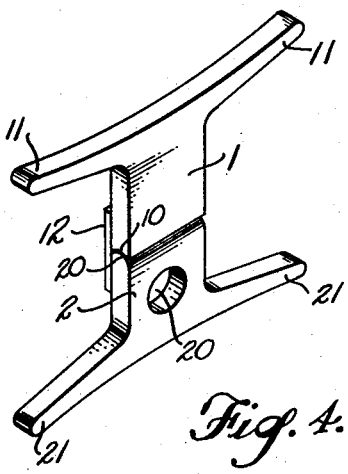
Fig. 4.
Fig. 2.
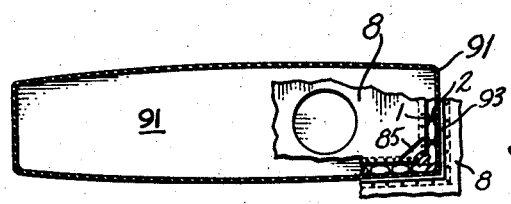
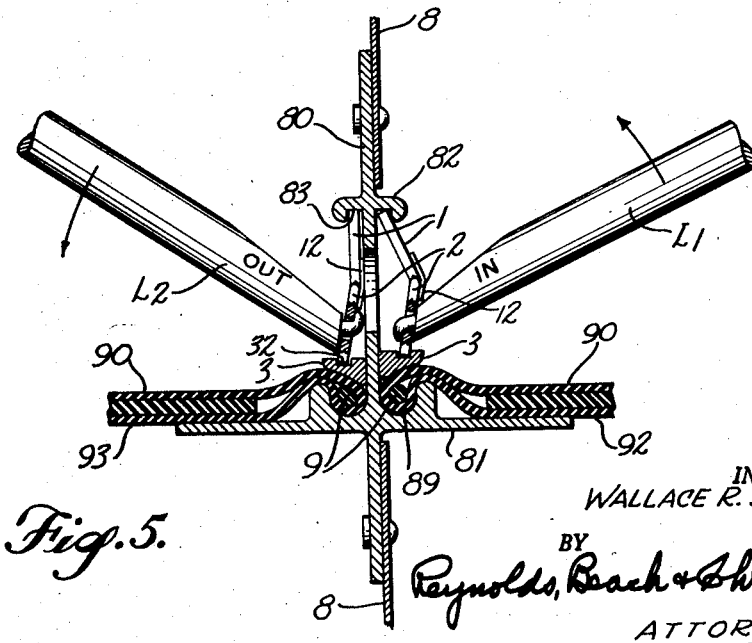
Fig. 5.
INVENTOR.
WALLACE R. SWANSON
BY
Reynolds, Beach & Christensen
ATTORNEYS

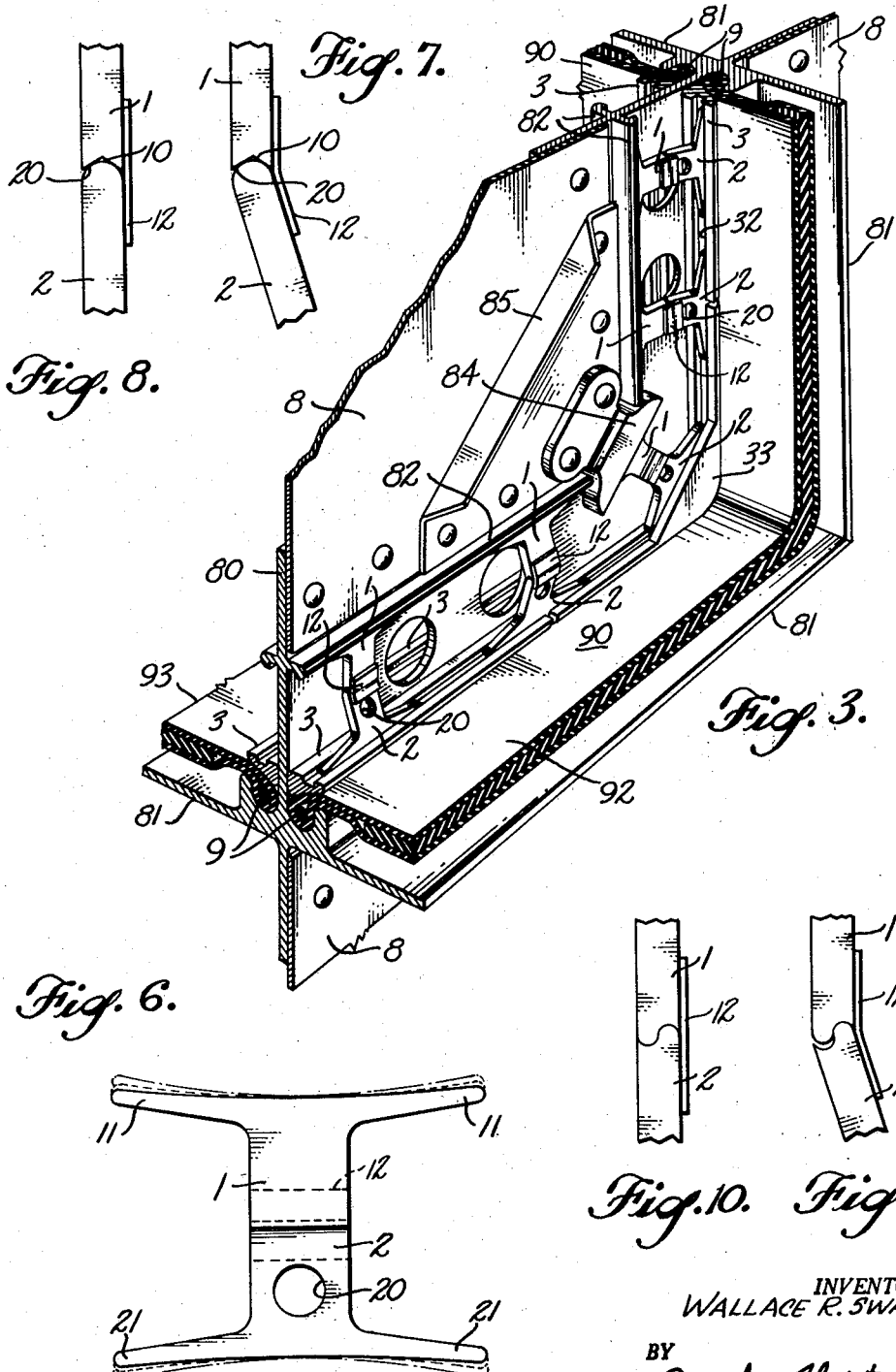

United States Patent Office 2,859,812
Patented Nov. 11, 1958

2,859,812

FUEL CELL BEAD RETAINERS

Wallace R. Swanson, Seattle, Wash., assignor to Boeing Airplane Company, Seattle, Wash., a corporation of Delaware Application May 28, 1954, Serial No. 433,060

6 Claims. (Cl. 160—368)

This invention relates to an airplane fuel cell structure, and in particular to a fuel cell bead retaining device, of the general nature disclosed in the application of Tatom et al., Serial No. 145,166, filed February 20, 1950, now Patent No. 2,726,056 dated December 6, 1955. Moreover, its principles may be incorporated in a design wherewith to accomplish the purposes explained in the application of Charles A. Bosserman, Serial No. 422,739, filed April 13, 1954, now Patent No. 2,736,521 dated February 28, 1956, although it is not herein shown in connection with the double-beaded construction of the Bosserman application.

In the Tatom et al. patent, a fuel tank is disclosed, made up of a plurality of individual cell structures, each including a sheet, in the form of a bag or sleeve, of pliant material, such as rubber or a rubber composition which is impervious to airplane fuel, these several cells being joined together by reason of the fact that the adjacent edges of adjoining sections are secured to and sealed with relation to support structures, such as the bulkhead structures of wing ribs or the like within the wing of an airplane. The securement and sealing of the pliant sheets is accomplished by squeezing resiliently deformable beads, along the edges of the pliant sheets, into grooves in the support structure. The squeezing in the Tatom et al. construction was accomplished by the use of thrust members reacting between a reaction ledge, spaced from but parallel to the groove, and the bead within the groove, or reacting between the reaction ledge or flange and a filler bar interposed between the thrust members and the bead, and co-operating to squeeze the bead into the groove. The present invention is of the same general nature, but is directed to the provision of thrust means for use in such a structural combination, of a nature to be more readily secured in bead-retaining position, and likewise more readily removable, but which at least are equally securely retained in bead-retaining position, except when removal is required.

More particularly it is an object to provide a retaining device of the sort indicated, in which securement and removal will not produce scuffing or wear of such a nature that the retaining means soon becomes inefficient or unreliable, or that the support structure itself, in a comparatively short time, may have to be renewed.

It is also an object to provide a retaining means of the nature indicated, which is readily manufactured in quantities, of readily available materials, and which is not in any sense dependent for its securement upon the possession of any inherent resilience.

Nevertheless it is an object to provide a securing device of the sort indicated, in which resilience is a desirable quality, and is made use of, not for the purpose of permitting movement of the securing devices to their secured position, nor of retaining them therein, but for the purpose of taking up any slack that may develop from a set, or loss of resilience, in the resiliently deformable material of the sheet or of the bead while the same is compressed.

It is also an object to provide a securing means of the sort indicated, which is readily adapted to the securement and equalization of compressive forces upon the bead about corners at the angles of such a fuel cell.

With such objects in mind, and others as will appear more fully hereinafter, the present invention comprises the novel bead retaining means and the novel combination and arrangement thereof relative to the other portions of the tank structure and aircraft supporting structure, as shown in the accompanying drawings, and as will be more fully explained and claimed hereinafter.

Figure 1 is in general a plan view of such a multi-cell fuel tank, all wing structure except the bulkheads being omitted.

Figure 2 is in general a transverse sectional view through such a tank, the line of section being indicated at 2—2 of Figure 1.

Figure 3 is an isometric view of a corner construction and adjoining, substantially straight runs of such a joint, illustrating parts of two fuel cells and the intervening support structure.

Figure 4 is an isometric view of a single toggle device such as constitutes the thrust element according to the present invention.

Figure 5 is a transverse sectional view through a joint such as that shown in Figure 3, illustrating at one side the manner of movement of a toggle device into its retaining position, and at the other side the manner of removing such a toggle device from its retaining position.

Figure 6 is an elevational view of such a toggle device, illustrating in dash lines and in dot-dash lines various positions it may assume under different conditions.

Figures 7 and 8 are edge views of the preferred form of hinged interconnection between the two toggle parts, Figure 7 showing the parts in one relative position, and Figure 8 showing them in a different position.

Figures 9 and 10 are views similar to Figures 7 and 8, respectively, but showing a modified form of hinge interconnection.

The fuel tank, shown in Figures 1 and 2, comprises several individual cells, such as the end cells 91 and 92, and the intermediate cell 93. There may be a number of such intermediate cells, but only one is shown for purposes of illustration. Each such cell is made in the form of a bag open at one end, in the case of the cells 91 and 92, or in the form of a sleeve open at both ends, as in the case of the cell 93. The material of which each cell is made is of a pliant nature, and of a material, such as neoprene, which is rubber-like but impervious to or not affected by the fuel which the tank is to contain. The cell wall may also contain a self-sealing material, sandwiched between two face sheets. Such a tank as a whole, and the individual cells thereof, may be shaped to conform to the spaced within the wing of an airplane which the tank is to fill.

The individual cells are secured along their edges to support structure, generally indicated at 8, which in effect may constitute a wing rib or a bulkhead at spaced stations in the span of the wing. For the purposes of this invention an extrusion 80 may conveniently constitute part of the bulkhead or support structure, and in it are formed the several ledges, flanges and the like which serve the purposes of the present invention, although it is entirely feasible to secure these flanges, ledges and the like separately and individually to the bulkhead or support structure.

The pliant sheet 90 as a whole, of which each cell is made, is formed entirely about its edge, as an extension thereof, and along each bulkhead 8, with a bead 9, which includes or is inherently of resiliently deformable material.

The extrusion 80 is formed along lines which coincide generally with the planes of the several sides of the fuel cells, with a ledge 81 outstanding at one or both faces, and is further formed, at some spacing from this ledge, with a generally parallel flange 82. In each ledge 81 is a groove 89, preferably placed close to the web of the extrusion 80 for strength, which groove opens toward and faces the flange 82. The groove 89 is of a size to receive the bead 90, but of no great excess size.

The thrust means employed react between the reaction flange 82 and the bead 9 received within the groove 89. Preferably, but not necessarily, this thrust means includes a filler bar 3 of a size and shape to cooperate with the remainder of the thrust means, to squeeze the bead 9 into its groove, to distribute compressive forces along the bead, and to deform the bead, when the thrust means as a whole are in operative position. This filler bar 3, when used, preferably extends the entire length of the groove 89 and the bead 9, and follows the curvature of the bead.

Primarily the thrust means includes a toggle device made up, according to the present invention, of two parts 1 and 2. Preferably these are entirely separate elements, stamped from sheet material, aluminum alloy for example, hingedly interconnected along a common edge to define a hinge axis parallel to the groove 89 and to the flange 82, and of a length such that when they are crowded past a coplanar relationship, and stopped by contact with the web of the extrusion 80, they will press the bead 9 deeply within its groove and deform it, either directly or through the medium of the filler bar 3. The two parts 1 and 2 may be joined by a strip of resilient material, and preferably of material which is resiliently extensible, such as a strip of rubber (which term is intended to include neoprene), indicated at 12. Primarily this is a convenience to hold the two parts in proper operative relationship until they are secured in place, or after their removal, but the strip 12 could serve also as a buffer, to prevent chafing and noise which might arise from vibration, if, as is seen at the left in Figure 5 for example, the strip 12 is butted against the web of the extrusion. Preferably the strip 12 is outermost when the toggle device is installed, as is seen at the right in Figure 5; see also Figure 3.

One form of the hinged joint between the toggle parts 1 and 2 is shown, for example, in Figures 7 and 8. The part 1 is grooved, as indicated at 10, by milling its edge or by a like operation, and the mating edge of the part 2 may be rounded, as indicated at 20, whereby when these two parts are matched, and particularly when they are held in their matched relationship by the flexible strip 12, a hinged interconnection between the parts 1 and 2 is accomplished. An alternative form of hinged joint is shown in Figures 9 and 10, wherein each part is formed with a groove and with a matching and parallel ridge, whereby the parts 1 and 2 interfit exactly and interchangeably.

As has been stated, it is preferred that the toggle parts 1 and 2 be stamped from sheet metal, for instance from aluminum alloy sheet. It is desirable that the material of which they are made possess at least some slight degree of resilience. Such being the case, each can be formed with oppositely directed thin arms 11 and 21, which when unstressed are bowed in such manner that the ends of the arms contact respectively the reaction flange 82 and the filler bar 3 at widely spaced points. Since the individual toggle devices are of such aggregate length that they will crowd the bead 9 into its groove, when they are in coplanar, or slightly past coplanar, relationship one to another, the compressive force thus created serves to deflect the somewhat resilient arms 11 and 21. For example, as shown in Figure 6, their unstressed position is that represented by the dot-dash lines, whereas when they are initially stressed by the compressive forces their position may be that shown in full lines. If the assembly is left thus stressed, however, the resilient material of the bead, or used in conjunction with the bead, may in time take a set, by reason of some loss of its resilience. When and as this occurs the slack is automatically taken up by the continuing resilience of the arms 11 and 21, and these arms may now relax somewhat to the dash-line position of Figure 6.

In assembling the fuel tank the beaded edges of the several individual cells 91, 92, 93, etc, are received in their corresponding grooves 89, the filler bars 3, if these are to be used, are positioned along the beads, and a number of the toggle devices are spaced along the flanges 82 and the filler bars 83 at suitable intervals, in the relationship shown at the right in Figure 5. Their outer edges may seat in retaining grooves 83 and 32, respectively. One of the two toggle parts, for example the toggle part 2, is provided with an aperture 20, within which may be engaged a fulcrum lever, such as the lever L1 shown at the right in Figure 5. The hooked end thereof, passing through the aperture 20, serves, by swinging in the direction of the arrow at the right, to urge the toggle member 2 inwardly toward the web of the extrusion, and through the grooved hinge interconnection between the parts 2 and 3, the part 1 swings also, without any separation between the two, until the toggle parts snap past a coplanar position into the position slightly past coplanar relationship, such as is shown at the left in Figure 5. The joining hinge edges 10, 20 abut against the web of the bulkhead and this stops parts in a thrust-producing position. In this position of the parts the bead 9 is resiliently deformed, and the seal is tight. Whenever it is desired to remove the fuel cell it is only necessary to use the opposite end L2 of the fulcrum lever, as shown at the left in Figure 5, the slightly differently hooked end of which engages again through the aperture 20, whereupon, by swinging in the direction of the arrow at the left, the toggle parts are moved past coplanar relationship, and immediately snap to an unstressed position, where they can be lifted out.

The same arrangement, with but slight modification, serves to secure the bead around a corner. A construction to that end is shown in Figure 3. The reaction flange 82 can be omitted at the corners and replaced by a corner reaction block 84 secured to the bulkhead 8 or to the extrusion. It may be backed by a reinforcing gusset plate 85. Its edge is disposed transversely across the corner, and in lieu of any filler bar 3 a corner filler block 33 is employed, which has an edge facing the edge of the corner reaction block 84, and spaced from the latter the same distance as the flange 82 is spaced from the filler bar 3. In consequence a simple toggle device, of the same nature as all others, serves to urge the filler piece 33 into the corner, and so to hold it down tightly against the bead at the corner. The ends of the filler block 33 may be held in position by bridging them with toggle devices that also engage the adjoining ends of the respective filler bars 3. It is preferred that the edge of the filler block 33 be grooved similarly to the filler bar's groove at 32, and that the reaction block 84 be also grooved similarly to the groove at 83, for the reception of the ends of the arms 11 and 21.

It will be noted that there is no particular wear on any part of the extrusion nor of the filler bar 3 in moving the toggle devices into or from their bead-retaining positions. In consequence such an assembly enables the fuel cells to be removed and inspected and replaced as often as may be necessary, with no necessity to replace or repair any parts due to wear of the retaining devices, nor alternatively, of anticipating failure as a result of wear. While the two toggle parts are wholly separate, and thus can be made simply, and if need be identical according to the form shown in Figures 9 and 10, nevertheless they are held in the preferred form against accidental separation by virtue of the flexible hinge strip 12.

It will be clear that the purpose of the resilience of the arms 11 and 12 can be served adequately if only one such toggle part has resilient arms, and in that case it is immaterial which of the two parts has the resilient arms.

I claim as my invention:

1. For use in securing and sealing a filler bar urging a resiliently deformable bead along the edge of a pliant sheet, such as an internal wing fuel section, within a groove of a support structure such as the wing bulkhead structure of an airplane, by reaction from a reaction flange carried by said bulkhead structure and paralleling but spaced from the groove: retaining means comprising a toggle device including a flange-engaging plate and a separate filler-bar-engaging plate hingedly interengaged along a line parallel to the bar and flange, one such plate being grooved along its hinged edge and the other such plate being complementally rounded along its hinged edge, such grooved and rounded edges constituting the hinged interengagement, and the plates being conjointly of a length to press the filler bar into its groove when the plates are relatively hingedly moved slightly past coplanar relationship.

2. The combination of claim 1, wherein the toggle plates are each formed along its edge which abuts the other with a groove and with a parallel ridge of complemental shape, by the interfitting whereof to constitute the hinge interconnection between the plates.

3. For use in securing and sealing a filler bar urging a resiliently deformable bead along the edge of a pliant sheet, such as an internal wing fuel section, within a groove of a support structure such as the wing bulkhead structure of an airplane, by reaction from a reaction flange carried by said bulkhead structure and paralleling but spaced from the groove: retaining means comprising a toggle device including a flange-engaging plate and a separate filler-bar-engaging plate hingedly interengaged along a line parallel to the bar and flange, the plates being conjointly of a length to press the filler bar into its groove when the plates are relatively hingedly moved slightly past coplanar relationship, and a piece of flexible material secured to each plate, bridging the hinge line.

4. Retaining means as in claim 3, wherein the flexible piece is formed of sheet rubber, and is stretchable under the relative hinging action of the plates.

5. For use in urging and sealing the resiliently deformable bead along the edge of a pliant sheet, such as an internal wing fuel section, within a groove of a support structure such as the wing bulkhead structure of an airplane, by reaction from a reaction flange carried by said bulkhead structure and paralleling but spaced from the groove: retaining means comprising a toggle device including a flange-engaging plate and a filler-bar-engaging plate interengaged along and relatively movable about a line parallel to the bar and flange, and conjointly of a length to press the bead into its groove when the plates are relatively so moved slightly past coplanar relationship, the outer edge of at least one of the plates being formed with two resilient arms oppositely directed and engageable for pressing at the ends only of said arms.

6. The combination of claim 5, wherein both plates of the toggle device are formed of resilient sheet material, and each with oppositely directed arms of bowed form, to bear at their outer ends only.

References Cited in the file of this patent

UNITED STATES PATENTS

| | | |
|---|---|---|
| 975,172 | Speer | Nov. 8, 1910 |
| 2,375,025 | Mott | May 1, 1945 |
| 2,397,184 | Klose | Mar. 26, 1946 |
| 2,508,906 | Cunningham et al. | May 23, 1950 |
| 2,617,154 | Sutton et al. | Nov. 11, 1952 |
| 2,726,056 | Tatom et al. | Dec. 6, 1955 |

FOREIGN PATENTS

| | | |
|---|---|---|
| 286,959 | Germany | Sept. 1, 1915 |